(12) United States Patent
Sheu

(10) Patent No.: US 6,377,737 B1
(45) Date of Patent: Apr. 23, 2002

(54) FILLING COMPOUND HAVING ALUMINA GELLING AGENT

(75) Inventor: Jim Jenqtsong Sheu, Dunwoody, GA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/510,131

(22) Filed: Feb. 21, 2000

(51) Int. Cl.[7] .................................................. G02B 6/44
(52) U.S. Cl. ...................................................... 385/102
(58) Field of Search ................................ 385/100–109, 385/147

(56) References Cited

U.S. PATENT DOCUMENTS

| | | | |
|---|---|---|---|
| 4,701,016 A | 10/1987 | Gartside, III et al. | 350/96.23 |
| 4,867,526 A | 9/1989 | Arroyo | 350/96.23 |
| 4,900,126 A | 2/1990 | Jackson et al. | 350/46.23 |
| 5,187,763 A | 2/1993 | Tu | 385/100 |
| 5,285,513 A | 2/1994 | Kaufman et al. | 385/109 |
| 5,389,442 A | * 2/1995 | Candido et al. | 428/396 |
| 5,614,269 A | * 3/1997 | Hoskins et al. | 427/512 |
| 5,756,159 A | * 5/1998 | Hoskins et al. | 427/394 |
| 5,905,833 A | 5/1999 | Sheu | 385/109 |

* cited by examiner

Primary Examiner—Akm E. Ullah
(74) Attorney, Agent, or Firm—Thomas, Kayden, Horstemeyer & Risley, LLP

(57) ABSTRACT

An optical fiber cable having a core which includes at least one optical fiber transmission medium, a sheath system which is disposed about said core, and a filling material disposed within said core. The filling material of the optical fiber cable includes both a hydrocarbon carrier means, and a thickening system disposed within the hydrocarbon carrier means. The thickening system may include an inorganic constituent, either alumina or fumed alumina, and a polymer.

17 Claims, 4 Drawing Sheets

FILLING COMPOUND HAVING ALUMINA GELLING AGENT

TECHNICAL FIELD

The present invention is generally related to an optical fiber cable containing a filling material and, more particularly, to an optic fiber cable water-blocking filling material that is gel-like and fills interstices in the core.

BACKGROUND OF THE INVENTION

In the communications cable industry, it is well known that changes in ambient conditions lead to differences in water vapor pressure between the inside and the outside of a plastic cable jacket. This generally operates to diffuse moisture in a unidirectional manner from the outside of the cable to the inside of the cable. Eventually, this will lead to an undesirably high moisture level inside the cable, especially if a plastic jacket is the only barrier to the ingress of the moisture. High levels of condensed moisture inside a cable sheath system may have a detrimental effect on the transmission characteristics of communications cables whether the particular transmission media is metallic conductors or optical fibers.

The presence of moisture is particularly destructive when the cable will be exposed to colder environments where the moisture may freeze and introduce physical stresses and strains on the transmission fiber. Moisture may also enter the cable because of damage to the cable if the integrity of the cable's sheath system is compromised. For example, rodent and/or termite attacks, as well as external mechanical impacts or forces may cause openings in the sheath system of the cable to occur, allowing water to enter, and, if not controlled, to move longitudinally along the cable into splice closures.

Consequently, it should be no surprise that cables for transmitting communications signals must meet industry standards with respect to water-blocking provisions. For example, one industry standard requires that there be no transmission of water under a pressure head of one meter in one hour through a one meter length of optical cable.

In the prior art, various techniques have been used to prevent the ingress of water through the sheath system of a cable and along the core. For example, sometimes a metallic shield is used to protect a telecommunications cable against lightning, rodent and/or termite attacks. However, the forming of such a shield about a cable core requires the use of relatively low manufacturing line speeds. Also, the use of a metallic shield negates certain benefits resulting from what may otherwise be an all-dielectric optical fiber cable. Further in this regard, any lightning strikes attracted to the metal, as well as gradual corrosion, may cause holes in a metallic shield.

It is not uncommon to include provisions in addition to or as an alternative to a metallic shield for preventing the ingress of water into the core. Filling materials have been used to fill cable cores and to coat portions of cable sheath systems to prevent the longitudinal movement of any water which enters the cable. However, due to their physical make-up, the use of such materials often causes housekeeping problems for field personnel, particularly during splicing operations.

Typically, the compositions of matter used as filling materials, sometimes referred to as water-blocking materials, are semisolid or semiliquid substances that comprise a thickening or gelling agent in a liquid carrier. In optical fiber cables, a further important function of a filling material is the maintenance of the optical fibers in a low stress state. The chemical compatibility of the filling material to the various coating and color layers on the optical fiber itself is important as well.

A communications cable filling material, especially an optical fiber cable filling material, should meet a variety of requirements, including industry-standard drip tests. To pass these tests, the physical properties of a cable having such filling materials in its core must remain within acceptable limits over a rather wide temperature range, e.g., from about −40° C. to about 80° C. In other words, the filling material should not drip out of cable even at 80° C. Oil separation is a property of a gel-like material, which describes the tendency to bleed oil during its lifetime. What is desired is a filling material, which has an oil separation no greater than 2% when centrifuged at relative centrifugal forces of 27,000 g at 25+−0.2° C. for two hours.

A further complication of the optical fiber cable situation is that suitable filling materials must yield under strains experienced when the cable is made or handled. Otherwise, movement of the optical fibers within the cable would be prevented and the fibers would buckle because they contact, with a relative small periodicity, a surface of the unyielding filling material. Such contact with an unyielding surface unfortunately introduces a large amount of microbending loss in the signal being carried by that fiber. In order to adequately address the concerns raised above, filling materials for use in optical fiber cables should have a relatively low shear modulus, $G_e$. However, it has been determined that, at least for some applications, a low value of $G_e$ of the filling material is not sufficient to assure low cabling loss, and that a further parameter, the critical yield stress, $\sigma_c$, may need to be controlled because it also affects the optical performance of fibers in a cable containing common types of filling materials.

One filling material having a relatively low critical yield stress is disclosed in U.S. Pat. No. 4,701,016 which issued on Oct. 20, 1987, to C. H. Gartside, III, et al. The disclosed filling material comprises oil, a gelling agent such as colloidal particles, and optionally, a bleed inhibitor. It includes 93% by weight of mineral oil and 7% by weight of hydrophobic fumed silica. Among oils useful in the practice of the invention are ASTM type (ASTM D-226 test) 103, 104A, or 104B, naphthenic oils having a minimum specific gravity of about 0.860 and a maximum pour point (ASTM D97) of less than approximately −4° C., and polybutene oils of minimum specific gravity of about 0.83 and a maximum pour point (ASTM D97) of less than about 18° C. The colloidal particle filler material preferably comprises silica particles. The critical yield stress of the filling material of the '016 patent is not greater than about 70 Pa (or about 0.01 psi), measured at 20° C., whereas the shear modulus is less than about 13 kPa (or about 1.89 psi), at 20° C.

Another filling material that is attractive for use in optical fiber cable is described in commonly-assigned U.S. Pat. No. 5,187,763 issued in the name of C. F. Tu on Feb. 16, 1993. However, even though the filling material set forth in the '763 patent adequately addresses some of the technical concerns recited above, it does not provide the necessary properties at elevated temperatures, i.e., about 80° C. In particular, this disclosed filling material does not appear capable of passing EIA/TIA Standard FOTP-81, Compound Flow (Drip) Test for Filled Optical Cable, Section 8 up to 80° C. while maintaining other desired properties such as a critical yield stress of less than about 0.002 psi.

Because cable drip is related to oil separation, constraints on the sought-after filling material include low oil separation, and low critical yield stress. In addition, the viscosity of the sought-after filling material is important with respect to processing. These constraints usually are antagonistic to each other. For example, reducing oil separation and increasing cable drip temperature requires high viscosity and critical yield stress, whereas facilitating processing and reducing optical loss requires low viscosity and critical yield stress.

A further filling material that is also attractive for use when optical fiber cables are described in commonly-assigned U.S. Pat. No. 5,905,833 issued in the name of Sheu on May 18, 1999. This filling material also adequately addresses some of the concerns provided above, and even provides the necessary properties at elevated temperatures, i.e., about 80° C. However, even upon use of a specific mixture of oils, and a specific mixture of fumed silicas, the filling material exhibits a viscosity that, while an improvement over prior filling materials, still increases over time.

Thus, a heretofore unaddressed need exists in the industry to address the aforementioned deficiencies and inadequacies.

SUMMARY OF THE INVENTION

The foregoing problems have been solved by a cable of this invention having the improved filling material within its core. The cable of this invention includes at least one core comprising at least one optical fiber transmission medium, an improved filling material disposed about the fibers, and a sheath system which is disposed about the core. The improved filling material enables the cable to pass EIA/TIA Standard FOTP-81, Compound Flow (Drip) Test for Filled Optical Cable, Section 8 up to 80° C. without adversely effecting any other operational performance characteristics of the cable. In one embodiment, the improved filling material includes a hydrocarbon carrier means, and a thickening system disposed within the hydrocarbon carrier means. In another embodiment, the filling material further includes an antioxidant.

Other features and advantages of the present invention will become apparent to one with skill in the art upon examination of the following drawings and detailed description. It is intended that all such additional features and advantages be included herein within the scope of the present invention.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENT

Figures 1, 2:
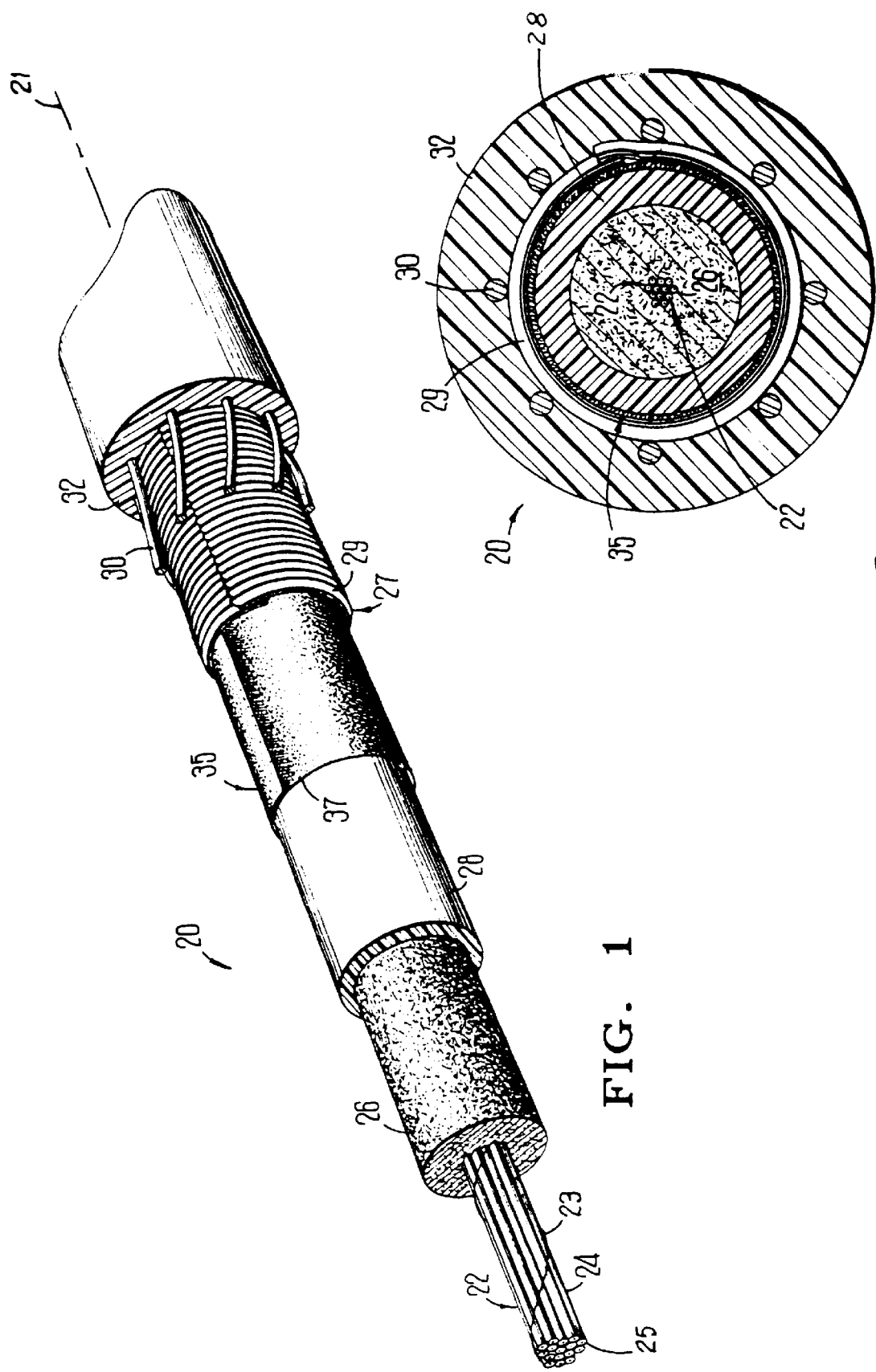
FIG. 1 is a perspective view of an optical fiber cable of this invention which has a core in which is disposed a filling material.
FIG. 2 is an end view in section of the cable of FIG. 1.

Referring now to FIGS. 1 and 2, there is shown a communications cable which is designated generally by the numeral 20 and which has a longitudinal axis 21. It includes a core 22 comprising optical fibers 25—25 which may be arranged in one or more units 24—24. Each of the optical fibers is provided with a protective coating system, which typically includes an inner primary coating layer and an outer secondary coating layer. Also, each of the coated fibers may be buffered with an outer layer of polyvinyl chloride (PVC), for example. Each of the units 24—24 may be wrapped with a binder ribbon 23. The core 22 includes a filling material 26 which is disposed within a tubular member 28 of a sheath system 27. The tubular member 28 often is referred to as a core tube.

The tubular member 28 may be enclosed by a metallic shield 29 and an outer plastic jacket 32. The sheath system 27 also may include strength members 30—30. Also, a water-blocking tape 35 may be wrapped about an outer surface of the core tube 28. The tape 35 may be a water-blocking tape that is disclosed, for example, in U.S. Pat. No. 4,867,526 which issued on Sep. 19, 1989, to C. J. Arroyo. Also, the filling material 26 may be used to fill the core of a cable that includes optical fiber ribbons such as those disclosed in U.S. Pat. No. 4,900,176 that issued on Feb. 13, 1990, in the names of K. W. Jackson, et al., and which is expressly incorporated by reference hereinto.

Technical constraints on sought-after filling materials comprising an oil constituent and intended for use in optical fiber cables include oil separation, cable drip temperature, critical yield stress and viscosity of the filling material. As mentioned hereinbefore, these constraints very often are antagonistic to each other or to other desired properties of the communications cable.

The critical yield stress of the desired filling material 26 should be such that it does not cause an increase in optical fiber loss over that of prior art filling materials at all temperatures. As stated in the Background, it is not believed that any of the prior art materials are able to pass a drip test at 80° C. while maintaining a critical yield stress of less than about 0.003 psi (20.7 Pa).

The filling material of the instant invention including fumed alumina demonstrated a yield stress of 0.00297 psi (20.5 Pa). This was measured on a Stresstech Rheometer available from RheoLogica Instruments AB in Lund, Sweden. The yield stress was measured using a parallel plate, 25 mm in diameter, with a 2.000 mm gap. The sheer stress ranges were as follows: for 25° C., 1.000–50.00 Pa in 200.0 seconds; and for −40° C., 1.000–500.0 Pa in 200.0 seconds. The ramp was performed linearly. As a matter of note, the undiscriminating use of gelling agents such as fumed silica material, fumed alumina material or polymer will rapidly increase the critical yield stress and also undesirably change the other properties of the filling material.

The desired viscosity characteristics for the filling material are directed toward accommodating processing concerns more so than concerns regarding cable performance. The viscosity of prior art filling material as measured by a Helipath viscometer falls in the range of 15 to 45 units using T spindle (Tb) at room temperature about three days after the material is made. Within certain limits, the lower the viscosity, the easier the filling material can be processed into an optical cable. In this regard, it is desired that the viscosity of any newly developed filling materials be in the general vicinity of that of prior art filling materials so that presently available processing facilities can be used.

The present application identifies one specific aspect of the composition of the filling material that significantly enhances its operation within a communications cable. In general, the novel aspect disclosed herein recognizes the benefits of utilizing alumina within the thickening system of the filling material. "Alumina" is used to refer to the precipitated form, fumed alumina, or a mixture of both. Fumed alumina is used in the preferred embodiment of the invention. It has been determined that unexpected synergistic effects occur when alumina is used in a filling material. In fact, it appears that these compositions allow communication cables to pass the recently elevated 80° C. drip test while maintaining other technical characteristics, such as yield stress, oil separation and viscosity, within their desired parameters as presently accepted by the industry.

The composition of matter of a filing material 26 preferably includes an oil constituent system that is a single hydrocarbon or combination or mixture of at least two different hydrocarbons, which can be either aliphatic or aromatic in type. More specifically, the hydrocarbon is preferably either synthetic oil or mineral oil or a combination thereof. The preferred oil constituent is in the range of about 80 to about 95 percent by weight of the filling material and the hydrocarbons have a relatively high molecular weight, i.e., in excess of about 500. In a particular preferred embodiment of the present invention, the composition of the filling material includes about 86.5% by weight of a synthetic oil, for example, polyalphaolefin such as SHF 404™ oil available from the Mobil Chemical Company.

As a matter of completeness, the viscosity of the SHF 404™ at 100° C. is approximately 40 centistokes. The polyalphaolefin aliphatic hydrocarbons are preferably characterized by a viscosity greater than about 8 centistokes at 100° C. Likewise, preferred polybutene oils and preferred mineral oils also have a viscosity greater than about 8 centistokes at 100° C.

Typically, it is beneficial to thicken the oil constituent so that it will not run out of a cable and so that oil separation is reduced. As stated earlier, oil separation or syneresis is a property of a gel-like filling material that describes the tendency to bleed oil during the lifetime of the filling material. Some prior art filling materials are known to separate oil if left undisturbed for a certain period of time. The syneresis is usually a slow process and, therefore, has to be determined by an accelerated method, for example, centrifugation. As mentioned hereinbefore, it is desired that the filling material 26 be characterized by a 2% maximum oil separation when centrifuged at a relative centrifugal force of 27,000 G at 25+−0.2° C. for two hours. In order to accomplish this, inorganic and organic thickening agents are usually included in the composition of the filling material.

Colloidal fillers such as alumina may be used as inorganic thickening agents. Colloidal filler particles in oil gel the oil by bonding surface hydroxyl groups to form a network structure in which the carrier is held by inter-molecular and capillary forces. Such gels are capable of supporting a load below a critical value of stress. Above this stress level, the network is disrupted, and the material assumes a liquid-like character and flows under stress. Such behavior often is referred to as thixotropic and is desirable to facilitate processing as well as to reduce microbending loss.

Typically, microbending loss in optical fiber cables is more difficult to control at long transmission wavelengths than at short ones. Thus, the requirements on the mechanical properties of a fiber cable filling material are typically substantially more severe for cable that is to be used at 1.55 μm, for example, than they are if the cable is to be used at shorter operating wavelengths of 1.3 μm, for example. Although it has been found that some prior art filling materials perform quite satisfactorily at wavelengths of up to about 1.3 μm, it has also been found that this is often not the case at longer wavelengths.

Because silica-based optical fibers typically have their lowest losses at or near the 1.55 μm wavelength, there is great interest in operating optical fiber telecommunication systems at approximately that wavelength. Furthermore, the newer fibers produced today have much higher transmission rates and capacity and typically operate at longer wavelengths. Thus, it is important to have available optical fiber cable that has no significant cabling-induced losses at long wavelengths, including about 1.55 μm. An ideal optical fiber cable should operate at most desirable wavelengths with low optical loss. An ideal filling materials should also be able to accommodate the same need.

In general, colloidal fillers useful in the cable 20 include colloidal alumina, either hydrophilic or hydrophobic, preferably a hydrophobic fumed alumina having a BET surface area between about 55 and about 200 $m^2/g$. As understood throughout the industry and used herein, BET surface area refers to a type of gas-absorption measurement based on Brunauer, Emmett and Teller (BET) Theory. An increase in the fumed alumina level decreases oil separation, but adversely increases the critical yield stress and the viscosity of the gel.

Now, turning specifically to the novel aspect of the filling material of this application as listed above, one example of a thickening system in accordance with a preferred embodiment of the present invention is fumed alumina, ideally having a BET surface area of about 145 $m^2/g$. Such material is available from the Cabot Corporation of Tuscola, Ill.

In addition to the compositional attributes discussed above, oil retention of the filling material 26 may be further improved by the addition of one or more organic thickening agents or bleed inhibitors to the composition of the filling material. Copolymers, such as rubbers, used as bleed inhibitors, are known to reduce oil separation of a gel-like filling material, yet do not contribute as much to increasing yield stress and viscosity. The bleed inhibitor may be a block copolymer, a relatively high viscosity semiliquid; sometimes referred to as semisolid, rubber, or other appropriate rubber. Block copolymers and semiliquid rubbers may be referred to collectively as rubber polymers. Incorporating a rubber polymer into the gel-like composition of matter allows a reduction in the amount of colloidal particles that must be added to the mixture to prevent syneresis of the gel. Furthermore, it makes possible the formulation of non-bleeding compositions having a relatively low critical yield stress.

Among the block copolymers that can be used in filling materials for the cable of this invention are styrene-rubber and styrene-rubber-styrene block copolymers having a styrene to rubber ratio between approximately 0.1 and 0.9 and a molecular weight, as indicated by Brookfield viscosity in toluene at 25° C. of from about 100 cps to more than about 50,000 cps in a 25% by weight rubber solution. Exemplary block copolymers include: (1) a styrene-ethylene propylene block copolymer (SEP), unplasticized, having a styrene to rubber ratio of about 0.59, a specific gravity of about 0.92, a break strength per ASTM D-412 of 300 psi, such being available from the Shell Chemical Company of Houston, Tex., under the trade designation of Kraton G1701™; (2) a styrene-ethylene propylene block copolymer having a styrene to rubber ratio of about 0.39 and available from the Shell Chemical Company under the designation Kraton G1702™; (3) styrene-ethylene butylene-styrene block copolymer (SEBS), unplasticized, and having a styrene to rubber ratio of about 0.15 or 0.41 available from the Shell Chemical Company under the trade designation Kraton G1657™ or G1650™ respectively; and (4) diblock or multi-arm copolymers of ethylene and propylene (EP) available from the Shell Chemical Company under the designation Kraton G1750™ or G1765™. Furthermore, yet another copolymer which may be used is Kraton 1726X™ copolymer (SEBS) which has a styrene to rubber ratio of about 0.43. The preferred embodiment includes Kraton G 1701X™ block copolymer in an amount of approximately 6% by weight of the filling compound.

Also included in the composition of the filling material 26 is an antioxidant system in the amount of about 1–2% by weight. The antioxidant constituents are hindered phenolic antioxidants which are relatively soluble in mineral oil. An acceptable antioxidant is one available from the Ciba-Geigy Company under the trade designation Irganox 1076™. A complete antioxidant or thermal stabilization system would have, typically, included a primary antioxidant, such as Irganox 1076™, and a secondary antioxidant such as Irganox 1035™, in order to have a synergistic effect. In a preferred embodiment, the filling material includes 1.7% by weight of Irganox 1076™ antioxidant and 0.3% by weight of Irganox 1035™ antioxidant, the latter constituent being used to achieve synergistic effect. Alternatively, 2% by weight of Irganox 1076™ may be used in lieu of a mixture of Irganox 1035™ and Irganox 1076™.

The solubility of Irganox 1035™ antioxidant in mineral oil is about 0.30 g/100 ml, and in polyalphaolefin is about 0.20 g/100 ml. The solubility of Irganox 1076™ in the mineral oil is 12 g/100 ml, and about 10 g/100 ml in a polyalphaolefin at 22° C. Other suitable non-precipitating antioxidants include Irganox 1520™ and Irganox 1010™, also available from the Ciba-Geigy Company.

Exemplary compositions of acceptable filling materials of this invention are shown in TABLE 1, with the constituents being given in percent by weight.

TABLE 1

Exemplary Compositions of Filling Material

|  | Example 1 | Example 2 |
|---|---|---|
| SHF 404™ | 86.5 | 84.5 |
| Kraton 1701™ | 6 | 6 |
| Irganox 1035™ | 0.3 | 0.3 |
| Irganox 1076™ | 1.7 | 1.7 |
| Fumed Alumina | 5.5 | 7.5 |
| Helipath | 46.0 (TB) | 50.8 (TC) |
| Y.S. ATS (psi) | 0.0012 |  |
| Oil Sep. | 0.9% |  |
| Drip (80° C.) | passed |  |

Figure 3:
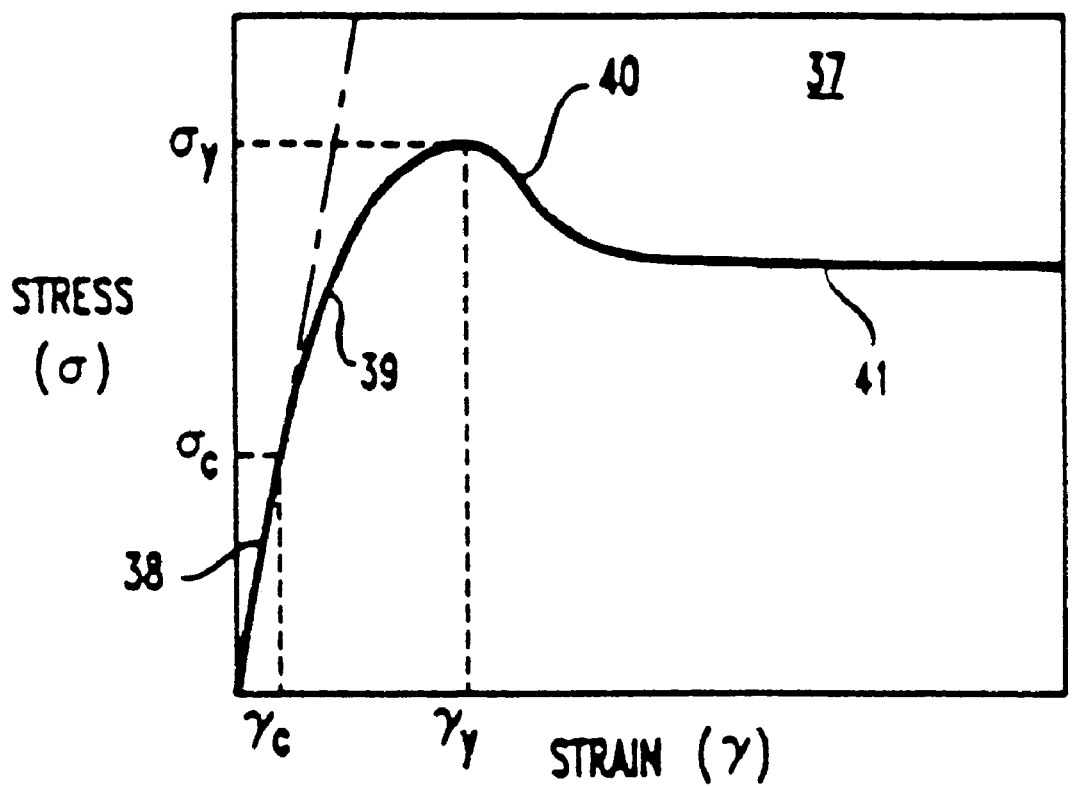
FIG. 3 depicts a generalized stress-strain curve of a filling material made in accordance with the present invention.

FIG. 3 shows a generalized stress-strain curve 37 at constant strain rate for a thixotropic material such as that used as the filling material 26 and identifies several important parameters. Along a segment 38 of the stress-strain curve 37, the material acts essentially as an elastic solid. The segment extends from zero stress to the critical-yield stress $\sigma_c$. The strain corresponding to $\sigma_c$ is identified as $\gamma_c$, the critical shear strain. By definition, the coordinates $\sigma_c$ and $\gamma_c$ indicate the onset of yielding and the quantity $\sigma_c/\gamma_c$ (or $d\sigma/d\gamma$ for $\gamma<\gamma_c$) is known as the shear modulus, $G_e$, of the material.

A segment 39 of the stress-strain curve of FIG. 3 represents increasing values of incremental strain for increasing stress. The stress $\sigma_y$ is the maximum value of stress sustainable by the material at a given strain rate with $\gamma_y$ being the corresponding strain. For strains in excess of $\gamma_y$, the stress at first decreases as shown by a segment 40, becoming substantially independent of strain for still greater values of strain as shown by segment 41. The filling material thus exhibits a liquid-like behavior for $\sigma$ at $\sigma_y$.

The composition of the filling material 26 of the present invention unexpectedly results in excellent properties. It would be expected that to increase the drip temperature, the yield stress and the viscosity would have to be increased, perhaps to unacceptable levels. Unexpectedly, the filling material of a cable made in accordance with this invention provides excellent results notwithstanding its relatively low viscosity. The thickening system, even when fumed alumina is used, performs several functions. Not only does the thickening system reduce oil separation, but it also keeps the viscosity low and decreases the yield stress when compared to what has been taught to date by known prior art, even for mixtures of fumed silicas.

It should be observed, however, that the level of the antioxidant constituent is still relatively high as compared to compositions commonly employed in other systems such as paints or oils. The main purpose for this is to provide a reservoir of antioxidants to counter the migration loss of the antioxidants and to increase the oxidative stability of the tubular member 28 and optical fiber coatings to prevent premature degradation of the optical fiber cable.

The filling material 26 of this invention also has enhanced performance at low temperature, particularly if a combination of oils having low resulting pour point is used, because it has a high cable drip temperature, no bleeding, and very low oil separation. The filling material 26 is compatible with presently used fiber coating materials and other cable materials that it contacts.

Figure 4:
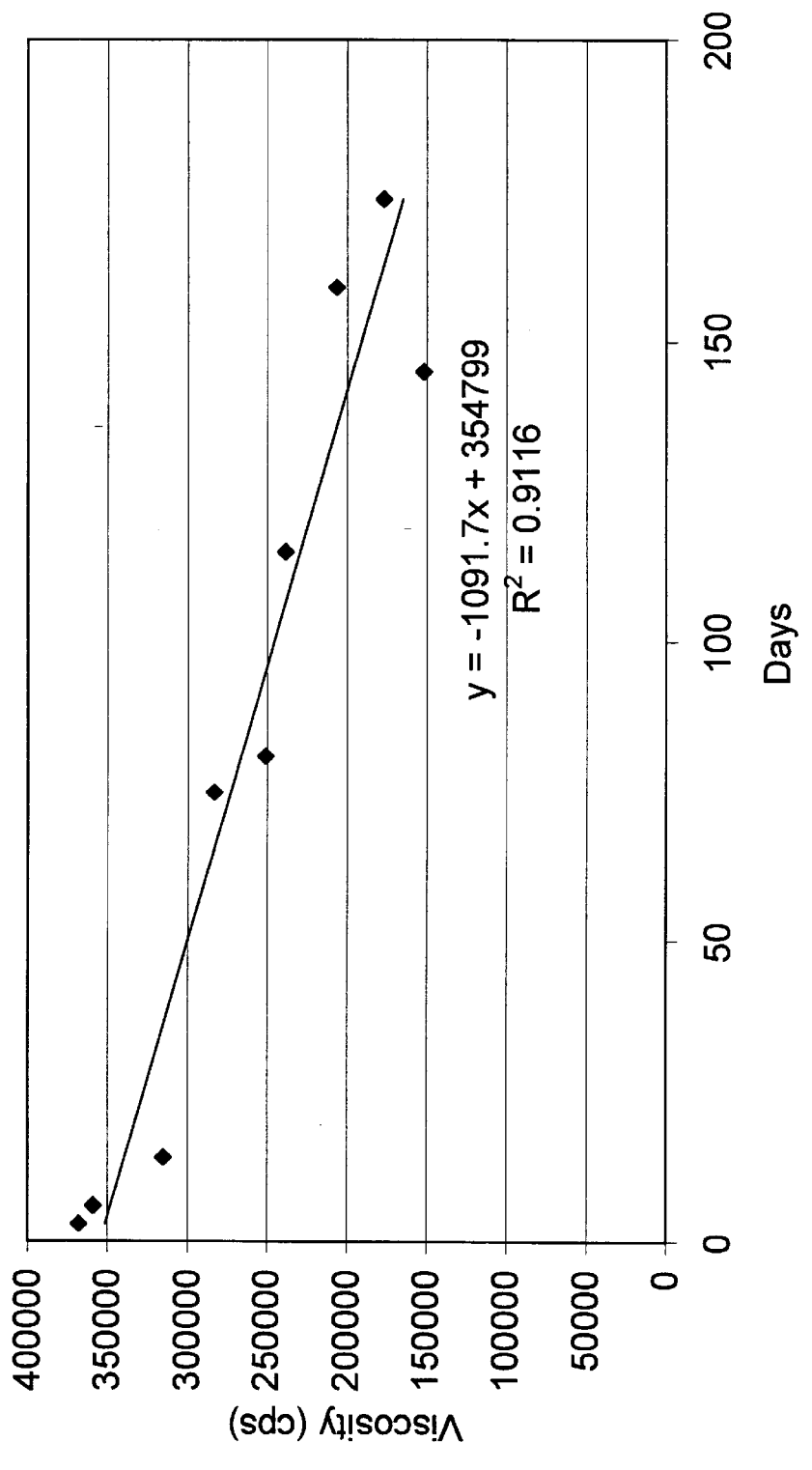
FIG. 4 depicts a graph of the timed viscosity of a filling material made in accordance with the preferred embodiment of the present invention.

The test results from the prior art show that at least one filling material made with an increase in fumed silica level in mineral oil, although reducing the oil separation and greatly increasing the viscosity, was still unable to pass the 65° C. cable drip test. In this regard, it is noted that passing an 80° C. cable drip test is currently required by at least one standards organization. Apparently, the use of just one fumed silica as the only thickening agent in a mineral oil-based filling material cannot enable a cable to pass the drip test without an adverse increase of viscosity and/or critical-yield stress. To avoid this result, the present invention uses only one alumina or fumed alumina in conjunction with a thermoplastic rubber. FIG. 4 depicts a graph of the timed viscosity of a filling material made in accordance with this particular preferred embodiment, plotting viscosity, in units of cps, versus time, in units of days.

It is noted that viscosity decreases as filling material ages. This is an unexpected desirable result and a contrast to most of the prior art materials. As noted before, lower viscosity aids cable processing. Moreover, once the cable is installed, frequently underground, the lower viscosity of the filling material will help the optical fibers relax and release the stresses that were imparted from the installation and handling. This helps in lowering the microbending loss.

For comparison, the viscosities of most of the prior art materials that included fumed silica increase with time. The increase in viscosity often is higher than desired and happens rather quickly, usually within a couple of months. One prior art material was able to keep the viscosity stable with time, as shown in U.S. patent application, Ser. No. 09/282,604 filed on Mar. 31, 1999, by Jim Sheu.

Figure 5:
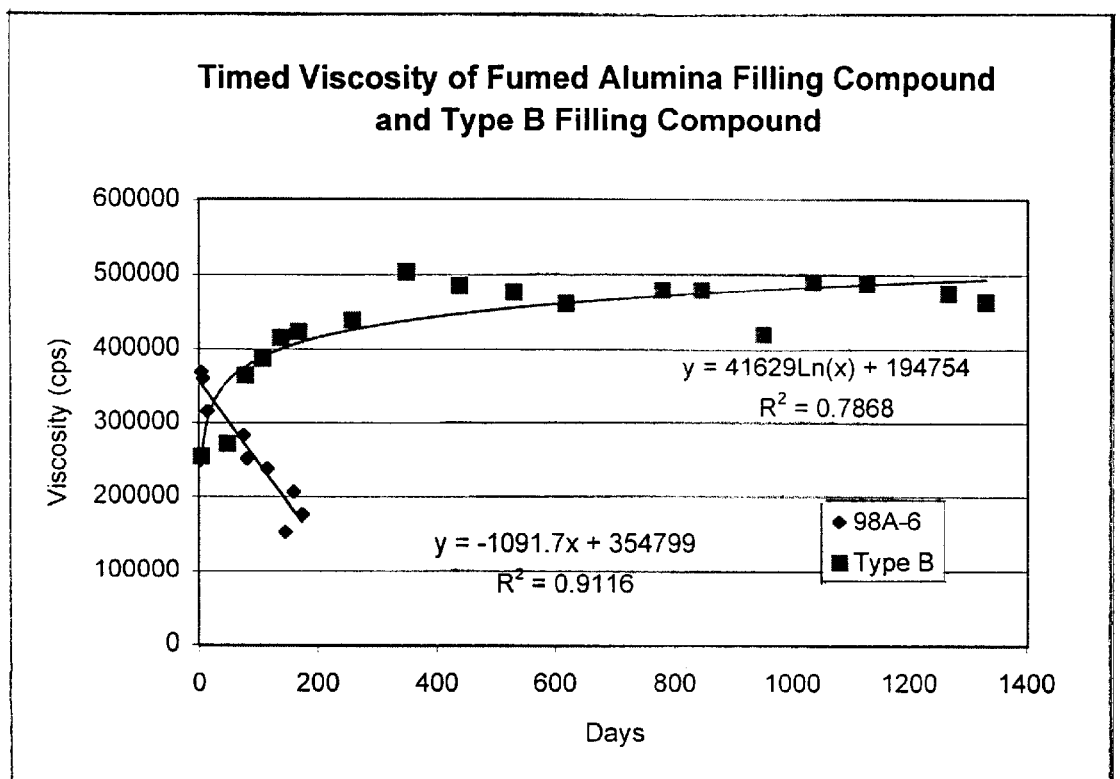
FIG. 5 depicts a graph of the timed viscosity of both a filling material of the present invention, as well as a filling material of prior art, using fumed silica.

FIG. 5 depicts a graph of the timed viscosity of both a filling material made in accordance with the preferred embodiment of the present invention, as well as a filling material made with fumed silica (marked Type B). The graph plots viscosity, in units of cps, versus time, in units of days. It can be seen from FIG. 5 that the viscosity of the fumed alumina filling compound decreases over time, while the fumed Type B viscosity exhibits a logarithmic response with respect to time. Thus, fumed alumina is better suited than fumed silica as a constituent in filling compounds in cables.

It is to be understood that the above-described arrangements are simply illustrative of the invention. Other arrangements may be devised by those skilled in the art which will embody the principles of the invention and fall within the spirit and scope thereof.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein with the scope of this disclosure and the present invention and protected by the following claims.

Therefore, having thus described the invention, at least the following is claimed:

1. An optical fiber cable comprising:
    a core having
        at least one optical fiber transmission medium;
        a sheath system which is disposed about said core; and
        a filling material which is disposed in said core, said filling material including
            a hydrocarbon carrier means; and
            a thickening system disposed within the hydrocarbon carrier means,
            wherein the thickening system includes
                alumina; and
                a polymer.

2. The optical fiber cable of claim 1 wherein the polymer within the thickening system comprises a diblock copolymer comprising a polystyrene block and a poly(ethylene-propylene) block having a styrene-rubber ratio in the range of about 0.1 to 0.9.

3. The optical fiber cable of claim 1 wherein the polymer within the thickening system comprises a linear copolymer comprising a styrene-ethylene-butylene-styrene block.

4. The optical fiber cable of claim 1 wherein the polymer within the thickening system comprises a multi-arm copolymer comprising a poly(ethylene-propylene) block.

5. The optical fiber cable of claim 1 wherein the hydrocarbon comprises at least 80 percent by weight of the filling material.

6. The optical fiber cable of claim 1 wherein the hydrocarbon is synthetic oil.

7. The optical fiber cable of claim 6 wherein the synthetic oil is selected from the group consisting of: polyalphaolefins, polyglycols, polybutenes, polyisobutylenes, polypropenes, ester oils and silicone fluids.

8. The optical fiber cable of claim 1 wherein the hydrocarbon is a mixture of synthetic oils.

9. The optical fiber cable of claim 8 wherein the mixture of synthetic oils is selected from the group consisting of: polyalphaolefins, polyglycols, polybutenes, polyisobutylenes, polypropenes, ester oils and silicone fluids.

10. The optical fiber cable of claim 1 wherein the hydrocarbon is a mineral oil.

11. The optical fiber cable of claim 10 wherein the mineral oil is selected from the group consisting of:
    paraffinic oils having a minimum specific gravity of about 0.86 and a pour point less than −4° C.; and
    naphthenic oils having a minimum specific gravity of about 0.86 and a pour point less than −40° C.

12. The optical fiber cable of claim 1 wherein the hydrocarbon is a mixture of mineral oils.

13. The optical fiber cable of claim 12 wherein the mixture of mineral oils is selected from the group consisting of:
    paraffinic oils having a minimum specific gravity of about 0.86 and a pour point less than −4° C.; and
    naphthenic oils having a minimum specific gravity of about 0.86 and a pour point less than −4° C.

14. The optical fiber cable of claim 1 further comprising an antioxidant in which said antioxidant is a high molecular weight, sterically hindered phenolic antioxidant.

15. An optical fiber cable comprising:
    core comprising at least one optical fiber transmission medium;
    a sheath system which is disposed about said core; and
    a filling material which is disposed in said core, said filling material including
        a thickening system including fumed alumina; and
        a polymer,
    said filling material and having a critical yield stress of less than about 0.002 psi (13.8 Pa).

16. An optical fiber cable of claim 15 wherein the filling material has an oil separation value of less than about 10%.

17. An optical fiber cable of claim 15 wherein the filling material comprises:
    an hydrocarbon carrier means; and
    a thickening system which comprises
        an inorganic constituent; and
        a polymer.

* * * * *